(12) United States Patent
Choi et al.

(10) Patent No.: US 9,237,051 B2
(45) Date of Patent: Jan. 12, 2016

(54) TRANSMITTING AND RECEIVING APPARATUSES FOR FREQUENCY DIVISION MULTIPLE ACCESS

(71) Applicant: Electronics & Telecommunications Research Institute, Daejeon (KR)

(72) Inventors: Seung Nam Choi, Daejeon (KR); Il Gyu Kim, Chungcheongbuk-do (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 31 days.

(21) Appl. No.: 14/313,170

(22) Filed: Jun. 24, 2014

(65) Prior Publication Data

US 2014/0376465 A1  Dec. 25, 2014

(30) Foreign Application Priority Data

Jun. 24, 2013  (KR) .......................... 10-2013-0072039

(51) Int. Cl.
*H04J 11/00* (2006.01)
*H04L 27/26* (2006.01)
*H04L 5/00* (2006.01)

(52) U.S. Cl.
CPC .......... *H04L 27/2636* (2013.01); *H04L 5/0042* (2013.01); *H04L 27/263* (2013.01)

(58) Field of Classification Search
USPC .......... 370/203–211; 708/200, 400, 403–405; 375/260

See application file for complete search history.

(56) References Cited

U.S. PATENT DOCUMENTS

| | | | |
|---|---|---|---|
| 7,715,492 B2 * | 5/2010 | Seki | H04L 27/2636 375/260 |
| 2010/0002575 A1 | 1/2010 | Eichinger et al. | |
| 2011/0134902 A1 * | 6/2011 | Ko | H04B 7/0434 370/344 |
| 2011/0194551 A1 * | 8/2011 | Lee | H04B 7/0626 370/342 |
| 2012/0002378 A1 | 1/2012 | Wang et al. | |
| 2012/0307760 A1 * | 12/2012 | Han | H04L 5/001 370/329 |
| 2013/0229993 A1 * | 9/2013 | Yang | H04L 5/0023 370/329 |

FOREIGN PATENT DOCUMENTS

KR  10-2009-0030759  3/2009

* cited by examiner

*Primary Examiner* — Phuc Tran
(74) *Attorney, Agent, or Firm* — Nelson Mullins Riley & Scarborough LLP

(57) ABSTRACT

A transmitting apparatus may comprise a symbol mapper; a first DFT and a second DFT performing DFT spreading on symbols mapped in the symbol mapper; and a subcarrier mapper mapping symbols which are DFT-spread in the first DFT and the second DFT to subcarriers, wherein the first DFT performs DFT spreading on all resource blocks to be transmitted when a total size of the resource blocks to be transmitted is a size which can be processed by the first DFT, or the first DFT performs DFT spreading on as many resource blocks among the resource blocks to be transmitted as the first DFT can process and the second DFT performs DFT spreading on the rest of the resource blocks to be transmitted when a total size of the resource blocks to be transmitted is not a size which can be processed by the first DFT.

19 Claims, 8 Drawing Sheets

FIG. 2A

| #RBs | #subcarriers | 2 | 3 | 5 | 7 | 11 | 13 | 17 | 19 | 23 | 29 | 31 | 37 | 41 | 43 | 47 |
|---|---|---|---|---|---|---|---|---|---|---|---|---|---|---|---|---|
| 1 | 12 | 2 | 1 | | | | | | | | | | | | | |
| 2 | 24 | 3 | 1 | | | | | | | | | | | | | |
| 3 | 36 | 2 | 2 | | | | | | | | | | | | | |
| 4 | 48 | 4 | 1 | | | | | | | | | | | | | |
| 5 | 60 | 2 | 1 | 1 | | | | | | | | | | | | |
| 6 | 72 | 3 | 2 | | | | | | | | | | | | | |
| 7 | 84 | 2 | 1 | | 1 | | | | | | | | | | | |
| 8 | 96 | 5 | 1 | | | | | | | | | | | | | |
| 9 | 108 | 2 | 3 | | | | | | | | | | | | | |
| 10 | 120 | 3 | 1 | 1 | | | | | | | | | | | | |
| 11 | 132 | 2 | 1 | | | 1 | | | | | | | | | | |
| 12 | 144 | 4 | 2 | | | | | | | | | | | | | |
| 13 | 156 | 2 | 1 | | | | 1 | | | | | | | | | |
| 14 | 168 | 3 | 1 | | 1 | | | | | | | | | | | |
| 15 | 180 | 2 | 2 | 1 | | | | | | | | | | | | |
| 16 | 192 | 6 | 1 | | | | | | | | | | | | | |
| 17 | 204 | 2 | 1 | | | | | 1 | | | | | | | | |
| 18 | 216 | 3 | 3 | | | | | | | | | | | | | |
| 19 | 228 | 2 | 1 | | | | | | 1 | | | | | | | |
| 20 | 240 | 4 | 1 | 1 | | | | | | | | | | | | |
| 21 | 252 | 2 | 2 | | 1 | | | | | | | | | | | |
| 22 | 264 | 3 | 1 | | | 1 | | | | | | | | | | |
| 23 | 276 | 2 | 1 | | | | | | | 1 | | | | | | |
| 24 | 288 | 5 | 2 | | | | | | | | | | | | | |
| 25 | 300 | 2 | 1 | 2 | | | | | | | | | | | | |

FIG. 2B

| #RBs | #subcarriers | 2 | 3 | 5 | 7 | 11 | 13 | 17 | 19 | 23 | 29 | 31 | 37 | 41 | 43 | 47 |
|---|---|---|---|---|---|---|---|---|---|---|---|---|---|---|---|---|
| 26 | 312 | 3 | 1 |   |   |    | 1  |    |    |    |    |    |    |    |    |    |
| 27 | 324 | 2 | 4 |   |   |    |    |    |    |    |    |    |    |    |    |    |
| 28 | 336 | 4 | 1 |   | 1 |    |    |    |    |    |    |    |    |    |    |    |
| 29 | 348 | 2 | 1 |   |   |    |    |    |    |    | 1  |    |    |    |    |    |
| 30 | 360 | 3 | 2 | 1 |   |    |    |    |    |    |    |    |    |    |    |    |
| 31 | 372 | 2 | 1 |   |   |    |    |    |    |    |    | 1  |    |    |    |    |
| 32 | 384 | 7 | 1 |   |   |    |    |    |    |    |    |    |    |    |    |    |
| 33 | 396 | 2 | 2 |   |   | 1  |    |    |    |    |    |    |    |    |    |    |
| 34 | 408 | 3 | 1 |   |   |    |    | 1  |    |    |    |    |    |    |    |    |
| 35 | 420 | 2 | 1 | 1 | 1 |    |    |    |    |    |    |    |    |    |    |    |
| 36 | 432 | 4 | 3 |   |   |    |    |    |    |    |    |    |    |    |    |    |
| 37 | 444 | 2 | 1 |   |   |    |    |    |    |    |    |    | 1  |    |    |    |
| 38 | 456 | 3 | 1 |   |   |    |    |    | 1  |    |    |    |    |    |    |    |
| 39 | 468 | 2 | 2 |   |   |    | 1  |    |    |    |    |    |    |    |    |    |
| 40 | 480 | 5 | 1 | 1 |   |    |    |    |    |    |    |    |    |    |    |    |
| 41 | 492 | 2 | 1 |   |   |    |    |    |    |    |    |    |    | 1  |    |    |
| 42 | 504 | 3 | 2 |   | 1 |    |    |    |    |    |    |    |    |    |    |    |
| 43 | 516 | 2 | 1 |   |   |    |    |    |    |    |    |    |    |    | 1  |    |
| 44 | 528 | 4 | 1 |   |   | 1  |    |    |    |    |    |    |    |    |    |    |
| 45 | 540 | 2 | 3 | 1 |   |    |    |    |    |    |    |    |    |    |    |    |
| 46 | 552 | 3 | 1 |   |   |    |    |    |    | 1  |    |    |    |    |    |    |
| 47 | 564 | 2 | 1 |   |   |    |    |    |    |    |    |    |    |    |    | 1  |
| 48 | 576 | 6 | 2 |   |   |    |    |    |    |    |    |    |    |    |    |    |
| 49 | 588 | 2 | 1 |   | 2 |    |    |    |    |    |    |    |    |    |    |    |
| 50 | 600 | 3 | 1 | 2 |   |    |    |    |    |    |    |    |    |    |    |    |

Prime factors

FIG. 4A

| #RBs | #subcarriers | Prime factors | | | | | | | | | | | | | | DFT size | |
|---|---|---|---|---|---|---|---|---|---|---|---|---|---|---|---|---|---|
| | | 2 | 3 | 5 | 7 | 11 | 13 | 17 | 19 | 23 | 29 | 31 | 37 | 41 | 43 | 47 | M-point | K-point |
| 1 | 12 | 2 | 1 | | | | | | | | | | | | | | 12 | |
| 2 | 24 | 2 | 1 | | | | | | | | | | | | | | 24 | |
| 3 | 36 | 3 | 2 | | | | | | | | | | | | | | 36 | |
| 4 | 48 | 2 | 1 | | | | | | | | | | | | | | 48 | |
| 5 | 60 | 4 | 1 | | | | | | | | | | | | | | 48 | |
| 6 | 72 | 2 | 1 | 1 | | | | | | | | | | | | | 60 | |
| 7 | 84 | 3 | 2 | | 1 | | | | | | | | | | | | 72 | |
| 8 | 96 | 2 | 1 | | | | | | | | | | | | | | 72 | 12 |
| 9 | 108 | 5 | 1 | | | | | | | | | | | | | | 96 | |
| 10 | 120 | 2 | 3 | | | | | | | | | | | | | | 108 | |
| 11 | 132 | 3 | 1 | 1 | | | | | | | | | | | | | 120 | |
| 12 | 144 | 2 | 1 | | 1 | | | | | | | | | | | | 120 | 12 |
| 13 | 156 | 4 | 2 | | | | | | | | | | | | | | 144 | |
| 14 | 168 | 2 | 1 | | | | 1 | | | | | | | | | | 144 | 12 |
| 15 | 180 | 3 | 1 | | 1 | | | | | | | | | | | | 144 | 24 |
| 16 | 192 | 2 | 2 | 1 | | | | | | | | | | | | | 180 | |
| 17 | 204 | 6 | 1 | | | | | | | | | | | | | | 192 | |
| 18 | 216 | 2 | 1 | | | | | 1 | | | | | | | | | 192 | 12 |
| 19 | 228 | 3 | 3 | | | | | | | | | | | | | | 216 | |
| 20 | 240 | 2 | 1 | 1 | | | | | | | | | | | | | 216 | 12 |
| 21 | 252 | 4 | 1 | | | | | | | | | | | | | | 240 | |
| 22 | 264 | 2 | 2 | | | 1 | | | | | | | | | | | 240 | 12 |
| 23 | 276 | 3 | 1 | | | | | | 1 | | | | | | | | 240 | 24 |
| 24 | 288 | 2 | 1 | | | | | | | | | | | | | | 240 | 36 |
| 25 | 300 | 5 | 2 | | | | | | | | | | | | | | 288 | |
| | | 2 | 1 | 2 | | | | | | | | | | | | | 300 | |

FIG. 4B

| #RBs | #subcarriers | Prime factors ||||||||||||| DFT size ||
| | | 2 | 3 | 5 | 7 | 11 | 13 | 17 | 19 | 23 | 29 | 31 | 37 | 41 | 43 | 47 | M-point | K-point |
| --- | --- | --- | --- | --- | --- | --- | --- | --- | --- | --- | --- | --- | --- | --- | --- | --- | --- | --- |
| 26 | 312 | 3 | 1 | | | 1 | | | | | | | | | | | 300 | 12 |
| 27 | 324 | 2 | 4 | | | | | | | | | | | | | | 324 | |
| 28 | 336 | 4 | 1 | | 1 | | | | | | | | | | | | 324 | 12 |
| 29 | 348 | 2 | 1 | | | | | | | | | | | | | | 324 | 24 |
| 30 | 360 | 3 | 2 | 1 | | | | | | | | | | | | | 360 | |
| 31 | 372 | 2 | 1 | | | | | | | | | 1 | | | | | 360 | 12 |
| 32 | 384 | 7 | 1 | | | | | | | | | | | | | | 384 | |
| 33 | 396 | 2 | 2 | | | 1 | | | | | | | | | | | 384 | 12 |
| 34 | 408 | 3 | 1 | | | | | 1 | | | | | | | | | 384 | 24 |
| 35 | 420 | 2 | 1 | 1 | 1 | | | | | | | | | | | | 384 | 36 |
| 36 | 432 | 4 | 3 | | | | | | | | | | | | | | 432 | |
| 37 | 444 | 2 | 1 | | | | | | | | | | 1 | | | | 432 | 12 |
| 38 | 456 | 3 | 1 | | | | | | 1 | | | | | | | | 432 | 24 |
| 39 | 468 | 2 | 2 | | | | 1 | | | | | | | | | | 432 | 36 |
| 40 | 480 | 5 | 1 | 1 | | | | | | | | | | | | | 480 | |
| 41 | 492 | 2 | 1 | | | | | | | | | | | 1 | | | 480 | 12 |
| 42 | 504 | 3 | 2 | | 1 | | | | | | | | | | | | 480 | 24 |
| 43 | 516 | 2 | 1 | | | | | | | | | | | | 1 | | 480 | 36 |
| 44 | 528 | 4 | 1 | | | 1 | | | | | | | | | | | 480 | 48 |
| 45 | 540 | 2 | 3 | 1 | | | | | | | | | | | | | 540 | |
| 46 | 552 | 3 | 1 | | | | | | | 1 | | | | | | | 540 | 12 |
| 47 | 564 | 2 | 1 | | | | | | | | | | | | | 1 | 540 | 24 |
| 48 | 576 | 6 | 2 | | | | | | | | | | | | | | 576 | |
| 49 | 588 | 2 | 1 | | 2 | | | | | | | | | | | | 576 | 12 |
| 50 | 600 | 3 | 1 | 2 | | | | | | | | | | | | | 600 | |

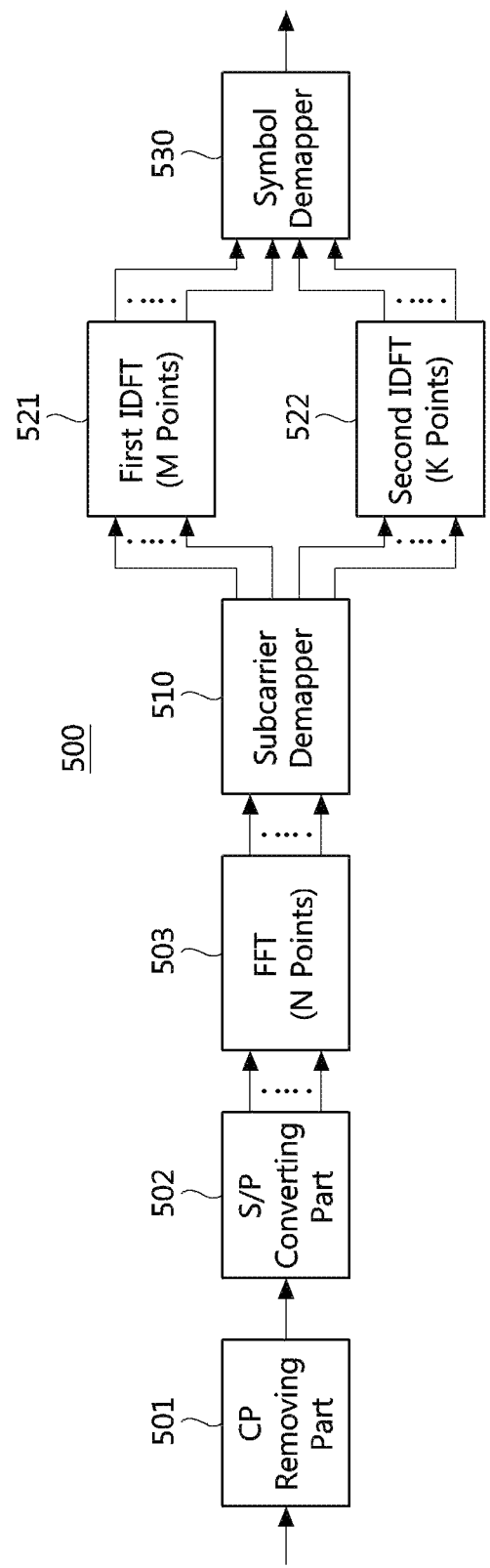

| RB# | Single DFT | Dual DFT | Difference |
|---|---|---|---|
| 7 | 6.06 dB | 6.41 dB | 0.35 dB |
| 23 | 6.63 dB | 6.97 dB | 0.34 dB |
| 44 | 6.74 dB | 7.01 dB | 0.27 dB |
| 47 | 6.74 dB | 6.89 dB | 0.15 dB |
| 49 | 6.74 dB | 6.82 dB | 0.08 dB |

TRANSMITTING AND RECEIVING APPARATUSES FOR FREQUENCY DIVISION MULTIPLE ACCESS

CLAIM FOR PRIORITY

This application claims priority to and the benefit of Korean Patent Application No. 10-2013-0072039 filed on Jun. 24, 2013 in the Korean Intellectual Property Office (KIPO), the entire contents of which are hereby incorporated by references.

BACKGROUND

1. Technical Field

Example embodiments of the present invention relate to apparatuses for transmitting and receiving for frequency division multiple access (FDMA), and more specifically to apparatuses for transmitting and receiving which can reduce inter-user interferences and make as many users as possible access to a communication system having limited capacity in the communication system to which multiple users can access simultaneously.

2. Related Art

The Long Term Evolution (LTE) and LTE-Advanced system, the current mobile communication systems, use an Orthogonal Frequency Division Multiple Access (OFDMA) as their downlink multiple access scheme, and use a Single Carrier Frequency Division Multiple Access (SC-FDMA) and a DFT spread OFDM (DFT-s-OFDM) as their uplink multiple access scheme.

The Single Carrier Frequency Division Multiple Access (SC-FDMA) is a multiple access scheme achieving a single carrier characteristic by additionally applying a DFT spreading technique to OFDMA. Generally, OFDMA has a shortcoming of high power consumption due to its high Peak-to-Average Power Ratio (PAPR). Battery-powered user terminals prefer multiple access schemes having low PAPR in order to reduce their power consumption. Although the SC-FDMA scheme is based on OFDMA, it has the single-carrier characteristic, and so it has lower PAPR as compared with that of OFDMA. In this reason, the Long-Term Evolution (LTE) and LTE-Advanced have adopted the SC-FDMA as their uplink multiple access scheme.

In implementations for the LTE, there is usually a restriction in size of DFT in order to reduce complexity of hardware. That is, a size of DFT is determined as being factorized into only prime numbers 2, 3, and 5. Therefore, there are restrictions in determining size of resource blocks (RB) allocated for uplink by a base station, and so scheduling performed by the base station also becomes complicated.

SUMMARY

Accordingly, example embodiments of the present invention are provided to substantially obviate one or more problems due to limitations and disadvantages of the related art.

Example embodiments of the present invention provide a transmitting apparatus for frequency division multiple accesses, which can reduce inter-user interferences and make as many users as possible access simultaneously to a system having restricted capacity.

Example embodiments of the present invention also provide a receiving apparatus for frequency division multiple accesses, which can reduce inter-user interferences and make as many users as possible access simultaneously to a system having restricted capacity.

In some example embodiments, a transmitting apparatus for frequency division multiple accesses may comprise a symbol mapper; a first discrete Fourier transformer (DFT) and a second discrete Fourier transformer (DFT) performing discrete Fourier transform spreading on symbols mapped in the symbol mapper; and a subcarrier mapper mapping symbols which are DFT-spread in the first DFT and the second DFT to subcarriers, wherein the first DFT performs DFT spreading on all resource blocks to be transmitted when a total size of the resource blocks to be transmitted is a size which can be processed by the first DFT, or the first DFT performs DFT spreading on as many resource blocks among the resource blocks to be transmitted as the first DFT can process and the second DFT performs DFT spreading on the rest of the resource blocks to be transmitted when a total size of the resource blocks to be transmitted is not a size which can be processed by the first DFT.

Here, the first DFT may be designed to perform DFT spreading on resource blocks having as many subcarriers as can be factorized into at least two prime numbers. Also, the at least two prime numbers may include at least two of 2, 3, and 5.

Here, the second DFT may be designed to perform DFT spreading on resource blocks having as many subcarriers as can be factorized into at least two prime numbers. Also, the at least two prime numbers may include at least two of 2, 3, and 5.

Here, a resource block comprises 12 subcarriers, and the first DFT performs DFT spreading on all resource blocks to be transmitted when a total size of the resource blocks to be transmitted is one of 1, 2, 3, 4, 5, 6, 8, 9, 10, 12, 15, 16, 18, 20, 24, 25, 27, 30, 32, 36, 40, 45, 48, and 50.

Here, a resource block comprises 12 subcarriers, and the first DFT performs DFT spreading on as many resource blocks among the resource blocks to be transmitted as the first DFT can process and the second DFT performs DFT spreading on the rest of the resource blocks to be transmitted when a total size of the resource blocks to be transmitted is one of 7, 11, 13, 14, 17, 19, 21, 22, 23, 26, 28, 29, 31, 33, 34, 35, 37, 38, 39, 41, 42, 43, 44, 46, 47, and 49.

In other example embodiments, a receiving apparatus for frequency division multiple accesses may comprise a subcarrier demapper de-mapping DFT-spread symbols for each subcarrier; a first inverse discrete Fourier transformer (IDFT) and a second inverse discrete Fourier transformer (IDFT) performing inverse discrete Fourier transform on the DFT-spread symbols; and a symbol demapper performing symbol demapping on the symbols which the first IDFT and the second IDFT perform inverse discrete Fourier transforms, wherein the first IDFT performs inverse discrete Fourier transform on all resource blocks received in the receiving apparatus when total size of the received resource blocks is a size which can be processed by the first IDFT, or the first IDFT performs inverse discrete Fourier transform on as many resource blocks among the received resource blocks as the first IDFT can process and the second IDFT performs inverse discrete Fourier transform on the rest of the received resource blocks when total size of the received resource blocks is not a size which can be processed by the first IDFT.

Here, the first IDFT may be designed to perform inverse discrete Fourier transform on resource blocks having as many subcarriers as can be factorized into at least two prime numbers. Also, the at least two prime numbers may include at least two of 2, 3, and 5.

Here, the second IDFT may be designed to perform inverse discrete Fourier transform on resource blocks having as many subcarriers as can be factorized into at least two prime numbers. Also, the at least two prime numbers may include at least two of 2, 3, and 5.

Here, a resource block comprises 12 subcarriers, and the first IDFT performs inverse discrete Fourier transform on all resource blocks received in the receiving apparatus when a total size of the received resource blocks is one of 1, 2, 3, 4, 5, 6, 8, 9, 10, 12, 15, 16, 18, 20, 24, 25, 27, 30, 32, 36, 40, 45, 48, and 50.

Here, a resource block comprises 12 subcarriers, and the first IDFT performs inverse discrete Fourier transform on as many resource blocks among the received resource blocks as the first IDFT can process and the second IDFT performs inverse discrete Fourier transform on the rest of the received resource blocks when a total size of the received resource blocks is one of 7, 11, 13, 14, 17, 19, 21, 22, 23, 26, 28, 29, 31, 33, 34, 35, 37, 38, 39, 41, 42, 43, 44, 46, 47, and 49.

In other example embodiments, a terminal apparatus having a transmitter for frequency division multiple accesses may comprise a symbol mapper; a first discrete Fourier transformer (DFT) and a second discrete Fourier transformer (DFT) performing discrete Fourier transform spreading on symbols mapped in the symbol mapper; and a subcarrier mapper mapping symbols which are DFT-spread in the first DFT and the second DFT to subcarriers, wherein the first DFT performs DFT spreading on all resource blocks to be transmitted when a total size of the resource blocks to be transmitted is a size which can be processed by the first DFT, or the first DFT performs DFT spreading on as many resource blocks among the resource blocks to be transmitted as the first DFT can process and the second DFT performs DFT spreading on the rest of the resource blocks to be transmitted when a total size of the resource blocks to be transmitted is not a size which can be processed by the first DFT.

Here, the frequency division multiple accesses are based on a Discrete Fourier Transform-spread-Orthogonal Frequency Division Multiple Access (DFT-s-OFDMA) scheme. Also, the transmitter is used for uplink of a third Generation Partnership (3GPP) Long Term Evolution (LTE) or LTE-Advanced system.

Here, at least one of the first DFT and the second DFT may be designed to perform DFT spreading on resource blocks having as many subcarriers as can be factorized into at least two prime numbers. Also, the at least two prime numbers may include at least two of 2, 3, and 5.

The transmitting apparatus and the receiving apparatus may overcome the above-described restrictions in scheduling and reduce scheduling complexity. Thus, frequency spectrum efficiency may be enhanced.

Also, power consumption may be reduced while maintaining hardware complexity similar to a case of a single DFT and negligible increase of PAPR.

BRIEF DESCRIPTION OF DRAWINGS

Example embodiments of the present invention will become more apparent by describing in detail example embodiments of the present invention with reference to the accompanying drawings, in which:

FIG. 2A and FIG. 2B are tables to explain scheduling restriction according to DFT designs in frequency division multiple accesses based on SC-FDMA;

FIG. 4A and FIG. 4B are tables to explain a method for using two DFTs in a transmitting apparatus to the present invention;

FIG. 5 is a block diagram to explain a configuration example of a receiving apparatus for frequency division multiple access according to the present invention;

DESCRIPTION OF EXAMPLE EMBODIMENTS

Figure 1:
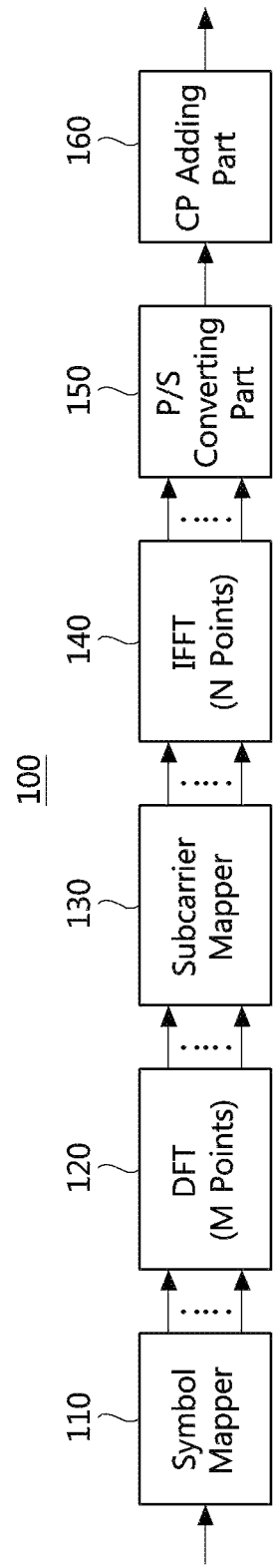
FIG. 1 is a block diagram to explain a configuration of a transmitting apparatus based on a SC-FDMA scheme.

Example embodiments of the present invention are disclosed herein. However, specific structural and functional details disclosed herein are merely representative for purposes of describing example embodiments of the present invention, however, example embodiments of the present invention may be embodied in many alternate forms and should not be construed as limited to example embodiments of the present invention set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The term "user equipment (UE)" used herein may refer to a mobile station (MS), user terminal (UT), wireless terminal, access terminal (AT), terminal, subscriber unit, subscriber station (SS), wireless device, wireless communication device, wireless transmit/receive unit (WTRU), mobile node, mobile, or other terms. Various embodiments of a UE may include a cellular phone, a smart phone having a wireless communication function, a personal digital assistant (PDA) having a wireless communication function, a wireless modem, a portable computer having a wireless communication function, a photographing apparatus such as a digital camera having a wireless communication function, a gaming apparatus having a wireless communication function, a music storing and playing appliance having a wireless communication function, an Internet home appliance capable of wireless Internet access and browsing, and also portable units or UEs having a combination of such functions, but are not limited to these.

The term "base station" used herein generally denotes a fixed or moving point that communicates with a UE, and may be a common name for Node-B, evolved Node-B (eNode-B), base transceiver system (BTS), access point, relay, femto-cell, and so on.

Hereinafter, exemplary embodiments of the present invention will be described in detail with reference to the accompanying drawings. To aid in understanding the present invention, like numbers refer to like elements throughout the description of the drawings, and the description of the same element will not be reiterated.

The Single Carrier Frequency Division Multiple Access (SC-FDMA) is a multiple access scheme achieving a single carrier characteristic by additionally applying a DFT spreading technique to OFDMA. Generally, OFDMA has a shortcoming of high power consumption due to its high Peak-to-Average Power Ratio (PAPR). Battery-powered user terminals prefer multiple access schemes having low PAPR in order to reduce their power consumption. Although the SC-FDMA scheme is based on OFDMA, it has the single-carrier characteristic, and so it has lower PAPR as compared with that of OFDMA. In this reason, the Long-Term Evolution (LTE) and LTE-Advanced have adopted the SC-FDMA as their uplink multiple access scheme.

FIG. 1 is a block diagram to explain a configuration of a transmitting apparatus based on a SC-FDMA scheme.

Referring to FIG. 1, a transmitting apparatus based on SC-FDMA may comprise a symbol mapper 110, a DFT 120, a subcarrier mapper 130, an IFFT 140, a Parallel-to-Serial converter (P/S) 150, and a cyclic prefix (CP) adding part 160. Actual implementation of a transmitting apparatus requires additional components, but a simplified example in which only essential components are included is illustrated in FIG. 1 for convenience of explanation.

The symbol mapper 110 generates complex symbol series each symbol of which is modulated by Quadratic Phase Shift Modulation (QPSK) or Quadratic Amplitude Modulation (QAM) from a sequence of scrambled bits.

The DFT 120 is a component which sequentially receives as many complex symbols as a predefined DFT size and performs discrete Fourier transform on the received complex symbols.

The subcarrier mapper 130 receives complex symbols on which DFT is performed (that is, DFT-spread symbols), and performs mapping of each of them to allocated subcarriers.

The IFFT 140 performs IFFT having a predetermined size N, and the P/S converting part 150 performs parallel-to-serial conversion on signals output from the IFFT 140. Then, the CP adding part 160 adds a Cyclic Prefix (CP) having a proper length to the signal output from the P/S converting part 150. At last, the signal to which CP is added is transmitted through a corresponding antenna port.

Meanwhile, the SC-FDMA may also be referred to as a DFT-Spread-OFDMA (DFT-s-OFDMA) which means a scheme of OFDMA to which a DFT spreading technique is added. Hereinafter, a frequency division multiple access scheme according to the present invention may be regarded as a kind of DFT-s-OFDMA.

In actual implementation for the LTE, there is usually a restriction in size of DFT in order to reduce complexity of hardware performing the DFT function. That is, a size of DFT is set to as being factorized into only prime numbers 2, 3, and 5. Accordingly, there are restrictions in determining size of resource blocks (RB) allocated for uplink by a base station, and so scheduling performed by the base station also becomes complicated.

FIG. 2A and FIG. 2B are tables to explain scheduling restriction according to DFT designs in frequency division multiple accesses based on SC-FDMA.

FIGS. 2A and 2B represent DFT sizes currently used in LTE. Although the maximum number of resource blocks (RB) for the current LTE is 100, tables show cases for only up to 50 RBs.

In FIG. 2A and FIG. 2B, RB sizes represented in normal boxes mean RB sizes which can be scheduled by a base station, and RB sizes represented in hatched boxes mean RB sizes which cannot be scheduled by a base station. For example, RBs having sizes of 7, 11, 13, 14, 17, 19, 21, 22, 23, 26, 28, 29, 31, 33, 34, 35, 37, 38, 39, 41, 42, 43, 44, 46, 47, and 49 cannot be scheduled by a base station.

Therefore, frequency spectrum efficiency may degrade due to unusable RB sizes. Also, scheduling function of a base station becomes complicated. Of course, it is possible to implement DFTs to perform DFT operations for arbitrary sized RBs. However, hardware complexity may increase.

A Configuration of a Transmitting Apparatus According to the Present Invention

Figure 3:
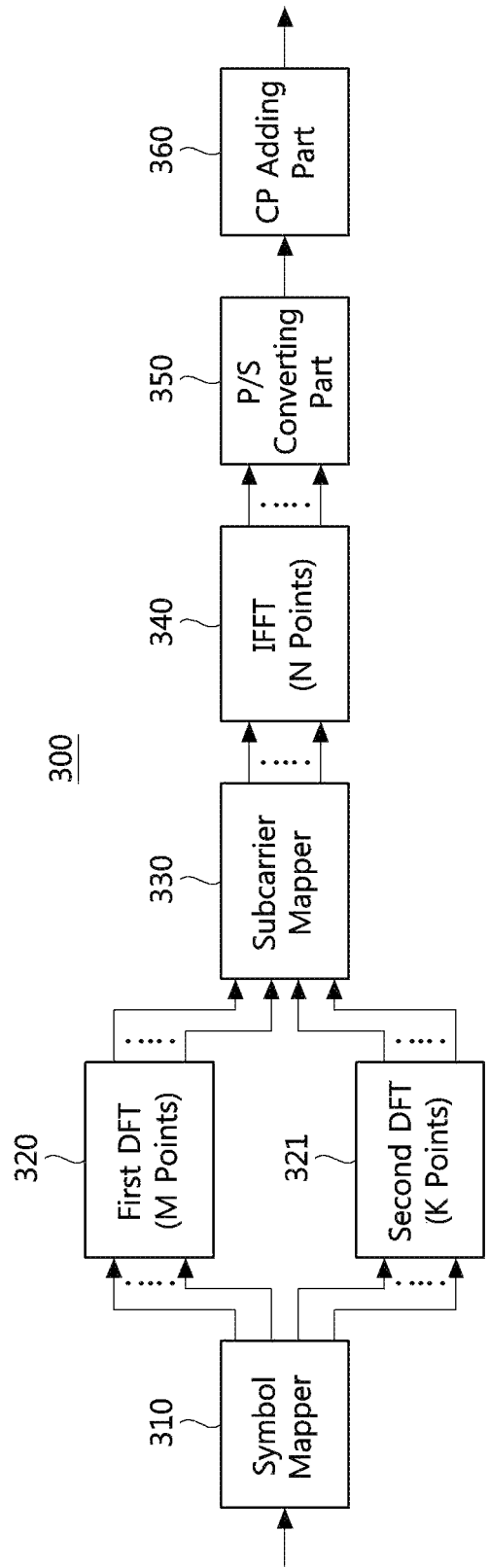
FIG. 3 is a block diagram to explain a configuration example of a transmitting apparatus for frequency division multiple access according to the present invention.

FIG. 3 is a block diagram to explain a configuration example of a transmitting apparatus for frequency division multiple access according to the present invention.

Referring to FIG. 3, an exemplary configuration of a transmitting apparatus 300 according to the present invention may comprise a symbol mapper 310, a first discrete Fourier transformer (DFT) 320, a second DFT 321, and a subcarrier mapper 330. Additionally, the exemplary configuration of a transmitting apparatus 300 may include an inverse fast Fourier transformer (IFFT) 340, a parallel-to-serial (P/S) converting part 350, and a cyclic prefix (CP) adding part 360.

Since roles of the symbol mapper, the subcarrier mapper, the IFFT, the P/S converting part, and the CP adding part have been already explained in FIG. 1, redundant explanation are omitted.

When the configuration illustrated in FIG. 3 is compared with the configuration illustrated in FIG. 1, difference between the two configurations is that the transmitting apparatus according to the present invention has two DFTs. That is, the transmitting apparatus according to the present invention has two DFTs, the first DFT 320 and the second DFT 321.

Since the transmitting apparatus according to the present invention also performs DFT spreading, the transmitting apparatus may be regarded to use the DFT-s-OFDMA scheme. However, it has two DFTs, and so it loses the single carrier characteristic so that PAPR increases slightly. As describe below, even though two DFTs are used, difference of PAPR between a case of a single DFT and a case of two DFTs is within only 0.5 dB. Accordingly, the transmitting apparatus according to the present invention is still proper to uplink in which decreasing power consumption is important.

In the transmitting apparatus according to the present invention, when a total size of RBs to be transmitted by the transmitting apparatus is a size which can be process by using only the first DFT 320, the first DFT 320 performs DFT spreading on all RBs to be transmitted. On the contrary, when a total size of RBs to be transmitted by the transmitting apparatus is not a size which can be process by using only the first DFT 320, the first DFT 320 performs DFT spreading on as many RBs as the first DFT can process, and the second DFT 321 performs DFT spreading on the rest of the RBs to be transmitted.

FIG. 4A and FIG. 4B are tables to explain a method for using two DFTs in a transmitting apparatus to the present invention.

Referring to FIGS. 4A and 4B, the transmitting apparatus according to the present invention performs M-point DFT operation on RBs which can be processed by a single DFT (that is, the first DFT). That is, the first DFT 321 may have the same configuration with the first DFT 120 in FIG. 1. As shown in FIGS. 4A and 4B, the sizes of RBs which can be processed by using only the first DFT are 1, 2, 3, 4, 5, 6, 8, 9, 10, 12, 15, 16, 18, 20, 24, 25, 27, 30, 32, 36, 40, 45, 48, and 50 (when only up to 50 RBs are considered).

On the contrary, when RBs having a size which cannot be processed by using only the first DFT 320 are scheduled to be transmitted, that is, a total size of RBs to be transmitted is one of 7, 11, 13, 14, 17, 19, 21, 22, 23, 26, 28, 29, 31, 33, 34, 35, 37, 38, 39, 41, 42, 43, 44, 46, 47, and 49, both the first DFT 320 and the second DFT 321 are used for DFT operations.

In other words, the size M of the first DFT 320 is adjusted to a maximum size of RBs which can be processed, and the first DFT 320 is configured to perform M-point DFT operation on as many RBs as possible. Also, the second DFT performs K-point DFT operation on the rest of the RBs to be transmitted.

In this case, if M is set to as large as possible and K is set to as small as possible, overall increase of PAPR can be suppressed. Also, since the second DFT 321 performs only small DFT operation, hardware complexity may increase slightly. Both sizes of the first DFT and the second DFT may be set to as being factorized into only prime numbers 2, 3, and 5. Alternatively, only one of the first DFT and the second DFT may be configured to have a size which can be factorized into only prime numbers 2, 3, and 5.

Usually, a frequency division multiple access method according to the present invention is applied to uplink of a mobile communication system, and so the above-described transmitting apparatus may be prepared in a terminal (user equipment). For example, since the DFT-s-OFDMA scheme is applied to uplink of the LTE or LTE-Advanced system, the above-described transmitting apparatus may be prepared in a terminal for the LTE or LTE-Advanced system.

Generally, in a mobile communication network, uplink scheduling function is performed in a base station side. Thus, a terminal receives information about RBs to be transmitted (size of RBs and frequency resources for them) from a base station, and transmits the RBs based on the received information.

Since the transmitting apparatus according to the present invention can perform DFT operations on arbitrary sized RBs, there is no restriction on RB sizes in frequency resource allocation so that scheduling without restriction may be possible in a scheduler.

A Configuration of a Receiving Apparatus According to the Present Invention

FIG. 5 is a block diagram to explain a configuration example of a receiving apparatus for frequency division multiple access according to the present invention.

Referring to FIG. 5, an exemplary configuration of a receiving apparatus 500 according to the present invention may comprise a subcarrier demapper 510, a first inverse discrete Fourier transformer (IDFT) 521, a second IDFT 522, and a symbol demapper 530. Additionally, the exemplary configuration of a receiving apparatus 500 may include a CP removing part 501, a serial-to-parallel (S/P) converting part 502, and a FFT 503.

The subcarrier demapper 510 and the symbol demapper 530 are components performing opposite operations of the subcarrier mapper 330 and the symbol mapper 310 explained referring to FIG. 1. Also, the CP removing part 501, the S/P converting part 502, and the FFT 503 are components performing opposite operations of the CP adding part 160, the P/S converting part 150, and the IFFT 140 explained referring to FIG. 1. Thus, redundant explanation on the above components is omitted.

The first IDFT 521 and the second IDFT 522 are components performing opposite operations of the first DFT 320 and the second DFT 321 explained referring to FIG. 3. That is, the first IDFT 521 is a component performing IDFT operation on signal on which the first DFT 320 performed DFT spreading, and the second IDFT 522 is a component performing IDFT operation on signal on which the second DFT 321 performed DFT spreading.

That is, in the receiving apparatus according to the present invention, when a total size of RBs received in the receiving apparatus is a size which can be process by using only the first IDFT 521, the first IDFT 521 performs IDFT on all received RB. On the contrary, when a total size of received RB is not a size which can be process by using only the first IDFT 521, the first IDFT 521 performs IDFT on as many RBs as the first IDFT can process, and the second IDFT 522 performs IDFT on the rest of the received RBs.

For example, as shown in FIGS. 4A and 4B, the sizes of RBs which can be processed by using only the first IDFT 521 are 1, 2, 3, 4, 5, 6, 8, 9, 10, 12, 15, 16, 18, 20, 24, 25, 27, 30, 32, 36, 40, 45, 48, and 50 (when only up to 50 RBs are considered).

If RBs having a size which cannot be processed by using only the first IDFT 521 received for the transmitting apparatus, that is, a total size of received RBs is one of 7, 11, 13, 14, 17, 19, 21, 22, 23, 26, 28, 29, 31, 33, 34, 35, 37, 38, 39, 41, 42, 43, 44, 46, 47, and 49, both the first IDFT 521 and the second IDFT 522 are used for IDFT operations.

In other words, the size M of the first IDFT 521 is adjusted to a maximum size of RBs which can be processed, and the first IDFT 521 is configured to perform M-point IDFT operation on as many RBs as possible. Also, the second IDFT performs K-point IDFT operation on the rest of the received RBs.

In this case, if M is set to as large as possible and K is set to as small as possible, overall increase of PAPR can be suppressed. Also, since the second IDFT 522 performs only small IDFT operation, hardware complexity may increase slightly. Both sizes of the first IDFT and the second IDFT may be configured as being factorized into only prime numbers 2, 3, and 5. Alternatively, only one of the first IDFT and the second IDFT may be configured to have a size which can be factorized into only prime numbers 2, 3, and 5.

Since the receiving apparatus uses two IDFTs identically to the above-described configuration of the transmitting apparatus, it may lose the single carrier characteristic so that PAPR increases slightly. However, difference of PAPR between a case of a single DFT and a case of two DFTs is within only 0.5 dB. Accordingly, the receiving apparatus according to the present invention is suitable for an uplink receiver of a base station.

Performance Analysis on Apparatuses According to the Present Invention

Figures 6, 7:
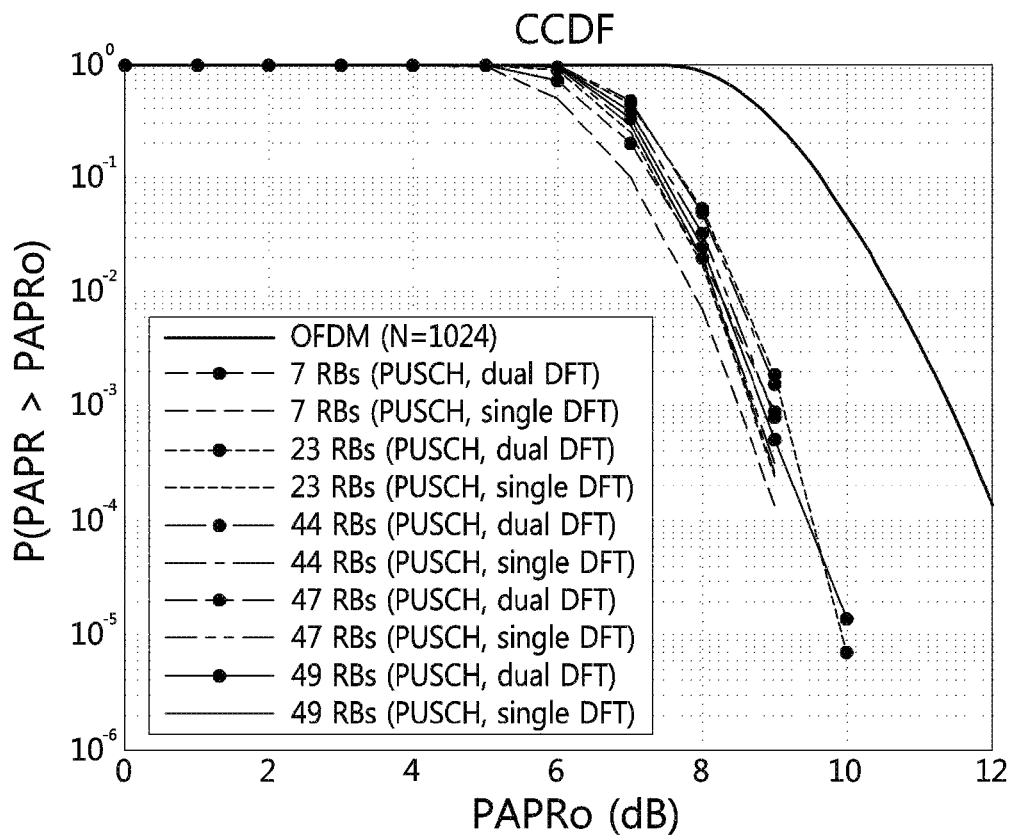
FIG. 6 is a graph to compare PAPR performances of a transmitting/receiving apparatus according to the present invention and a conventional transmitting/receiving apparatus.
FIG. 7 is a table to compare PAPR performances of a transmitting/receiving apparatus according to the present invention and a conventional transmitting/receiving apparatus.

FIG. 6 is a graph to compare PAPR performances of a transmitting/receiving apparatus according to the present invention and a conventional transmitting/receiving apparatus.

In FIG. 6, a size of FFT for OFDM is assumed to be 1024. Also, 16QAM is assumed to be used for a modulation scheme. The conventional transmitting/receiving apparatus is supposed to use the SC-FDMA scheme to transmit a Physical Uplink Shared Channel (PUSCH), and the transmitting/receiving apparatus according to the present invention is supposed to use DFT-s-OFDMA scheme using two DFTs (dual DFTs).

That is, FIG. 6 exemplarily illustrates PAPR performances when a single DFT is used and PAPR performances when two DFTs are used for cases of RBs having sizes of 7, 23, 44, 47, and 49.

Generally, it may be known that PAPR performances when a single DFT is used are slightly better than PAPR performances when two DFTs are used. However, two PAPR performances do not show critical difference.

FIG. 7 is a table to compare PAPR performances of a transmitting/receiving apparatus according to the present invention and a conventional transmitting/receiving apparatus.

As shown in FIG. 7, it may be known that increase of PAPR when two DFTs are used is suppressed within 0.5 dB.

While the example embodiments of the present invention and their advantages have been described in detail, it should be understood that various changes, substitutions and alterations may be made herein without departing from the scope of the invention.

What is claimed is:

1. A transmitting apparatus for frequency division multiple accesses, the apparatus comprising:
   a symbol mapper;
   a first discrete Fourier transformer (DFT) and a second discrete Fourier transformer (DFT) performing discrete Fourier transform spreading on symbols mapped in the symbol mapper; and
   a subcarrier mapper mapping symbols which are DFT-spread in the first DFT and the second DFT to subcarriers,
   wherein the first DFT performs DFT spreading on all resource blocks to be transmitted when a total size of the resource blocks to be transmitted is a size which can be processed by the first DFT, or the first DFT performs DFT spreading on as many resource blocks among the resource blocks to be transmitted as the first DFT can process and the second DFT performs DFT spreading on the rest of the resource blocks to be transmitted when a total size of the resource blocks to be transmitted is not a size which can be processed by the first DFT.

2. The apparatus of claim 1, wherein the first DFT is designed to perform DFT spreading on resource blocks having as many subcarriers as can be factorized into at least two prime numbers.

3. The apparatus of claim 2, wherein the at least two prime numbers include at least two of 2, 3, and 5.

4. The apparatus of claim 1, wherein the second DFT is designed to perform DFT spreading on resource blocks having as many subcarriers as can be factorized into at least two prime numbers.

5. The apparatus of claim 4, wherein the at least two prime numbers include at least two of 2, 3, and 5.

6. The apparatus of claim 1, wherein a resource block comprises 12 subcarriers, and the first DFT performs DFT spreading on all resource blocks to be transmitted when a total size of the resource blocks to be transmitted is one of 1, 2, 3, 4, 5, 6, 8, 9, 10, 12, 15, 16, 18, 20, 24, 25, 27, 30, 32, 36, 40, 45, 48, and 50.

7. The apparatus of claim 1, wherein a resource block comprises 12 subcarriers, and the first DFT performs DFT spreading on as many resource blocks among the resource blocks to be transmitted as the first DFT can process and the second DFT performs DFT spreading on the rest of the resource blocks to be transmitted when a total size of the resource blocks to be transmitted is one of 7, 11, 13, 14, 17, 19, 21, 22, 23, 26, 28, 29, 31, 33, 34, 35, 37, 38, 39, 41, 42, 43, 44, 46, 47, and 49.

8. A receiving apparatus for frequency division multiple accesses, the apparatus comprising:
   a subcarrier demapper de-mapping DFT-spread symbols for each subcarrier;
   a first inverse discrete Fourier transformer (IDFT) and a second inverse discrete Fourier transformer (IDFT) performing inverse discrete Fourier transform on the DFT-spread symbols; and
   a symbol demapper performing symbol demapping on the symbols which the first IDFT and the second IDFT perform inverse discrete Fourier transforms,
   wherein the first IDFT performs inverse discrete Fourier transform on all resource blocks received in the receiving apparatus when total size of the received resource blocks is a size which can be processed by the first IDFT, or the first IDFT performs inverse discrete Fourier transform on as many resource blocks among the received resource blocks as the first IDFT can process and the second IDFT performs inverse discrete Fourier transform on the rest of the received resource blocks when total size of the received resource blocks is not a size which can be processed by the first IDFT.

9. The apparatus of claim 8, wherein the first IDFT is designed to perform inverse discrete Fourier transform on resource blocks having as many subcarriers as can be factorized into at least two prime numbers.

10. The apparatus of claim 9, wherein the at least two prime numbers include at least two of 2, 3, and 5.

11. The apparatus of claim 8, wherein the second IDFT is designed to perform inverse discrete Fourier transform on resource blocks having as many subcarriers as can be factorized into at least two prime numbers.

12. The apparatus of claim 11, wherein the at least two prime numbers include at least two of 2, 3, and 5.

13. The apparatus of claim 8, wherein a resource block comprises 12 subcarriers, and the first IDFT performs inverse discrete Fourier transform on all resource blocks received in the receiving apparatus when a total size of the received resource blocks is one of 1, 2, 3, 4, 5, 6, 8, 9, 10, 12, 15, 16, 18, 20, 24, 25, 27, 30, 32, 36, 40, 45, 48, and 50.

14. The apparatus of claim 8, wherein a resource block comprises 12 subcarriers, and the first IDFT performs inverse discrete Fourier transform on as many resource blocks among the received resource blocks as the first IDFT can process and the second IDFT performs inverse discrete Fourier transform on the rest of the received resource blocks when a total size of the received resource blocks is one of 7, 11, 13, 14, 17, 19, 21, 22, 23, 26, 28, 29, 31, 33, 34, 35, 37, 38, 39, 41, 42, 43, 44, 46, 47, and 49.

15. A terminal apparatus having a transmitter for frequency division multiple accesses, the transmitter comprising:
- a symbol mapper;
- a first discrete Fourier transformer (DFT) and a second discrete Fourier transformer (DFT) performing discrete Fourier transform spreading on symbols mapped in the symbol mapper; and
- a subcarrier mapper mapping symbols which are DFT-spread in the first DFT and the second DFT to subcarriers,
- wherein the first DFT performs DFT spreading on all resource blocks to be transmitted when a total size of the resource blocks to be transmitted is a size which can be processed by the first DFT, or the first DFT performs DFT spreading on as many resource blocks among the resource blocks to be transmitted as the first DFT can process and the second DFT performs DFT spreading on the rest of the resource blocks to be transmitted when a total size of the resource blocks to be transmitted is not a size which can be processed by the first DFT.

16. The apparatus of claim 15, wherein the frequency division multiple accesses are based on a Discrete Fourier Transform-spread-Orthogonal Frequency Division Multiple Access (DFT-s-OFDMA) scheme.

17. The apparatus of claim 16, wherein the transmitter is used for uplink of a third Generation Partnership (3GPP) Long Term Evolution (LTE) or LTE-Advanced system.

18. The apparatus of claim 16, wherein at least one of the first DFT and the second DFT is designed to perform DFT spreading on resource blocks having as many subcarriers as can be factorized into at least two prime numbers.

19. The apparatus of claim 18, wherein the at least two prime numbers include at least two of 2, 3, and 5.

* * * * *